United States Patent [19]

Kunze

[11] 4,203,613
[45] May 20, 1980

[54] ADJUSTING DEVICE FOR THE DRAFT LINK OF A THREE-POINT MOUNTING DEVICE

[75] Inventor: Dieter Kunze, Siegburg, Fed. Rep. of Germany

[73] Assignee: Jean Walterscheid GmbH, Lohmar, Fed. Rep. of Germany

[21] Appl. No.: 932,605

[22] Filed: Aug. 10, 1978

[30] Foreign Application Priority Data

Aug. 30, 1977 [DE] Fed. Rep. of Germany ....... 2738951

[51] Int. Cl.² .......................................... A01B 59/043
[52] U.S. Cl. ................................. 280/460 A; 172/450
[58] Field of Search .......... 280/461 A, 460 A, 456 A, 280/497, 446 B; 172/450, 449, 451

[56] References Cited

U.S. PATENT DOCUMENTS

| | | | |
|---|---|---|---|
| 2,405,980 | 8/1946 | Sands | 280/461 A |
| 2,596,902 | 5/1952 | Krause | 280/456 A |
| 3,787,077 | 1/1974 | Sanders | 280/446 B |

FOREIGN PATENT DOCUMENTS

| | | | |
|---|---|---|---|
| 1221833 | 7/1966 | Fed. Rep. of Germany | 172/450 |
| 1254397 | 11/1967 | Fed. Rep. of Germany | 172/450 |

*Primary Examiner*—John A. Pekar
*Attorney, Agent, or Firm*—Toren, McGeady and Stanger

[57] ABSTRACT

An adjusting device for a draft link of a three-point mounting system used for supporting agricultural implements upon an agricultural tractor is formed essentially as a longitudinally adjustable bipartite strut assembly having a pair of ends, with one of the end connected in an articulated manner with the draft link of the mounting system and with the other end being connected to an appropriate fixed point on the agricultural tractor. The strut assembly includes two partially overlapping connecting arms and means joining the connecting arms together in frictional engagement for movement relative to each other.

3 Claims, 3 Drawing Figures

4,203,613

ADJUSTING DEVICE FOR THE DRAFT LINK OF A THREE-POINT MOUNTING DEVICE

BACKGROUND OF THE INVENTION

The present invention related generally to mechanical mounting devices suitable for use with agricultural tractors and more particularly to an adjusting device for a three-point mounting system including a draft link used for connecting agricultural implements onto a tractor.

Mounting devices for agricultural tractors usually are required to include means to facilitate adjustment of the mounting means in order to enable different types of implements to be suitably placed in operative mounting arrangement on the tractor. In the prior art, devices are available which enable adjustment of the space between the ends of rear draft links of mounting systems thereby to facilitate the adjustment of the mounting system to handle different implements. For example, it has been proposed to equip each draft link of a mounting system with a separate hydraulic cylinder in order to facilitate the adjustment or shifting of the draft link of the tractor mounting arrangement. (German Offenlegungsschrift No. 1,557,845). However, systems of this type involve a disadvantage in that the use of hydraulic equipment and the necessary control valves and lines which accompany such equipment tend to be very cumbersome. Furthermore, hydraulic control units and other similar elements will be exposed to damage because of their location on the tractor in close proximity to the soil. Furthermore, such hydraulic systems must be made with the capability of absorbing high impact stresses due to shocks which may be received during operation with a heavy tractor implement. Generally, such impact forces can be significantly higher than operational stresses which may arise from the inherent design of the equipment. If such impact stresses are not counteracted by relatively expensive and cumbersome measures, malfunctioning or other undesirable operational problems may be anticipated in the hydraulic system of the tractor.

The present invention is therefore directed toward providing an improved assembly for mounting implements on a tractor, and particularly to an improved adjusting device for the draft links of the three-point mounting systems for agricultural tractors which is relatively simple in design and which ensures that penetration by dirt or other deleterious material will not adversely affect the operability of the device during the performance of rough agricultural operations.

A SUMMARY OF THE INVENTION

Briefly, the present invention may be described as an adjusting device for the draft link of a three-point mounting system for an agricultural tractor which operates to mount various agricultural implements upon the tractor, the adjusting device consisting essentially of a longitudinally adjustable bipartite strut assembly having a pair of ends, with one of the ends of the strut being connected in an articulated manner to the draft link of the mounting system and with the other end of the strut being connected to an appropriate fixed point on the tractor. The strut assembly comprises two partially overlapping connecting arms and means joining the connecting arms together in frictional engagement for movement relative to each other.

The structural arrangement of the invention is particularly advantageous in that the adjusting device may consist of relatively few components which do not require special precise finishing, which are inexpensive to produce and which may be assembled upon a tractor without undue complication. Furthermore, by a simple swinging movement, the draft link of the mounting system may be moved to any desired position.

A further advantageous feature of the invention relates to the fact that the adjusting device is constructed with one of the two connecting arms of the assembly having an elongated slot defined therethrough along the portion of the arm where overlapping engagement with the other connecting arm exists. Furthermore, at least two screw-receiving holes are arranged in the other connecting arm and two screw bolts are provided which extend through the elongated slot of the first connecting arm and through the holes through the second connecting arm, the screw bolts having outwardly projecting ends upon which adjustment nuts are provided. Springs are arranged on the outwardly extending ends of the screw bolts and in a position to apply spring tension against the overlapping areas of the connecting arms and the adjustment nuts operate to enable adjustment of the spring tension of the springs.

As a result of the special arrangement of the invention, it may be advantageously provided with the capacity to enable adjustment of the magnitude of the frictional forces existing between the connecting arms, and the force necessary for longitudinal adjustment of the adjusting device, by a simple manipulation whereby the adjustment nuts are loosened or tightened. Additionally, change in the frictional force which may arise as the result of dirt or other material which has penetrated the assembly may be quickly compensated for in a similar manner.

In a further advantageous development of the invention at least one strip of a conventional friction material may be provided between the two connecting arms in order to increase the frictional effect in the overlapping area of the arms. Furthermore, an auxiliary plate may be provided having formed therein two screw receiving holes which are arranged in a position corresponding with the position of the screw-receiving holes in the second connecting arm. Thus, the screw bolts of the assembly may extend through the holes of the auxiliary plate and the springs may be arranged in engagement between the auxiliary plate and the adjustment nuts so that the spring force may be applied directly to the auxiliary plate.

As a result of the particular combination of the invention, the range of adjustment of the magnitude of the frictional force of the assembly may be increased while, at the same time enabling most of the wear which is developed during operation of the invention to be absorbed essentially by the strip of friction material which may be easily replaced.

In accordance with a further embodiment of the invention there is advantageously provided a compression spring at each end of the elongated slot formed in the first connecting arm of the assembly, with each of the compression springs acting to apply a spring force inwardly against one each of the screw bolts. A pair of set screws are provided one each in operative engagement with one of the springs whereby the springs may be adjusted within the elongated slot.

Because of the arrangement of adjustable compression of the springs at the ends of the elongated slot, the adjusting device of the invention may be adjusted within a wide range to accommodate various categories of implements mounted upon the tractor.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE PREFERRED EMBODIMENT

Figure 1:
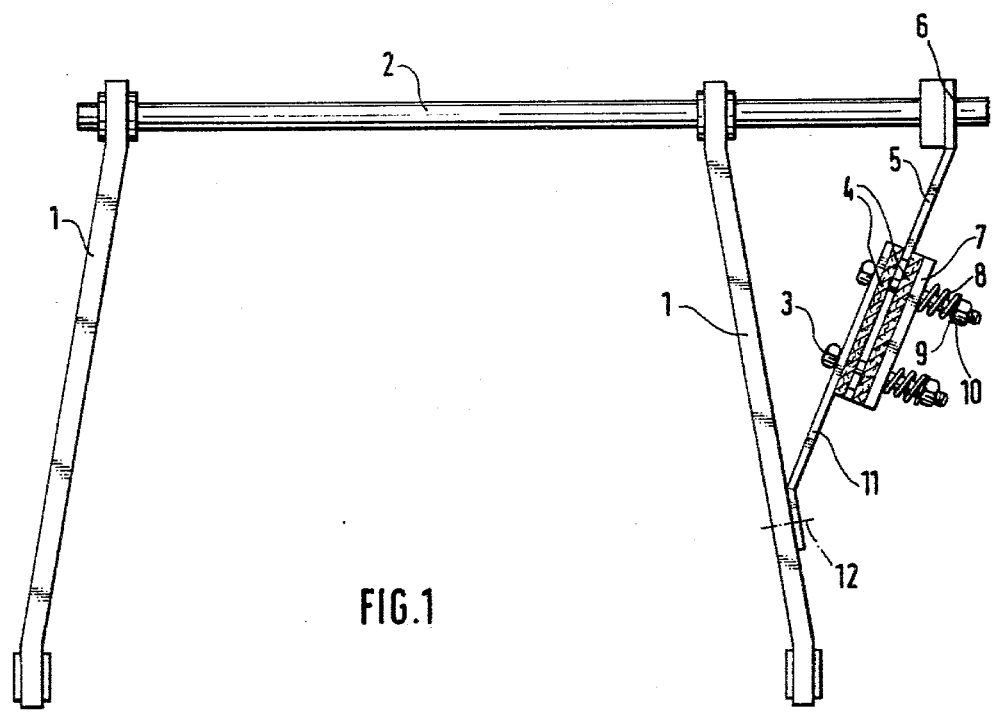
FIG. 1 is a view showing a mounting system having an adjusting device in accordance with the invention mounted upon a draft link of the mounting system.
Figure 2:
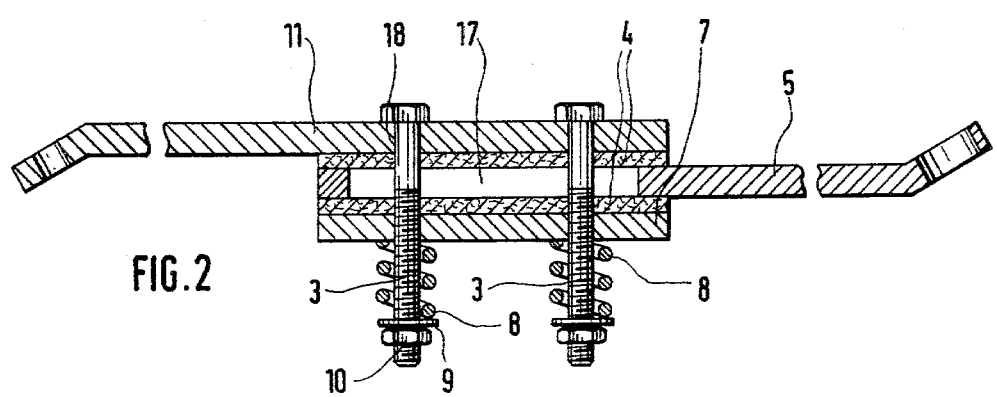
FIG. 2 is a sectional view through the adjusting device of the invention.

Referring now to the drawings wherein like reference numerals are used to designate similar parts throughout the various figures thereof, and referring particularly to FIG. 1, there is shown an adjusting device for the draft link 1 of a three-point mounting system for a farm tractor adapted to enable mounting of an operational implement upon the tractor. Although in the illustration of FIG. 1 there is shown only one adjusting device mounted upon one only of the connecting links shown, it should be understood that in practice both of the draft links 1 may be advantageously provided with a similar adjusting device.

FIG. 1 shows a shaft 2 having an extended length which operates to support thereupon the draft link 1. A supporting arm 5 of the adjusting device is connected to an extended portion of the supporting shaft 2 through a connection device 6. Of course, it should be understood that the connection of the adjusting device with the tractor may be provided at any other fixed point on the tractor suitable for the indicated purpose other than the extended portion of shaft 2.

The adjusting device also includes another or second connecting arm 11 which is, in turn, connected in an articulated manner with the corresponding draft link 1 through a connection point 12.

The connecting arm 5 is provided with an elongated slot 17 extending in a portion of the arm 5 which is arranged in essentially overlapping relationship with a portion of the arm 11. The connecting arm 11 is provided with a pair of round holes 18 which may receive therethrough threaded bolt members. A strip of conventional friction material 4 is advantageously arranged between the two connecting arms 5 and 11.

An auxiliary plate 7 is provided on the side of the connecting arm 5 located opposite the side adjacent the connecting arm 11. A strip of friction material 4 may also be provided between the auxiliary plate 7 and the connecting arm 5.

A pair of screw bolts 3 extend through slot 17 formed in the connecting arm 5, with the bolts also extending through the round holes 18 formed in the connecting arm 11 and through similar corresponding holes formed in the auxiliary plate 7.

On the outer side of the auxiliary plate 7, the two screw bolts 3 project outwardly thereof an extent sufficient to permit compression springs 8 to be mounted upon the bolts 3. The compression springs 8 are held in engagement and supported between the auxiliary plate 7 and adjustment nuts 10 provided with washers 9 located at the ends of the bolts 3. The adjustment nuts 10 are threadedly adjustably mounted upon the bolts 3 and, accordingly, the magnitude of the frictional force developed by the adjusting device may be changed in a simple manner simply by adjusting the nut 10 to alter the compressive force of the springs 8.

Figure 3:
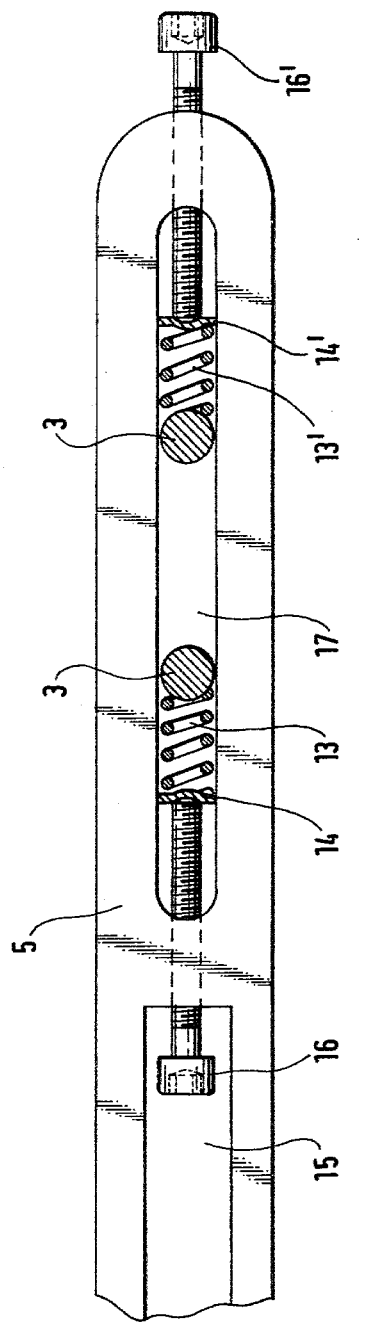
FIG. 3 is a view showing a connecting arm of the adjusting device of the invention having compression springs inserted at the ends of an elongated slot in one of the connecting arms of the device.

FIG. 3 shows a further embodiment of the invention wherein a compression spring 13, 13' is arranged at each end of the elongated slot 17 of the connecting arm 5. Each of the compression springs 13, 13' is advantageously supported at the ends of elongated slot 17 by means of a spring washer 14, 14'. The compression springs, 13, 13' extend inwardly of the slot 17 and at their inwardly directed ends the springs abut against one of the two screw bolts 3. A set screw 16' is provided at the free end of the connecting arm 5. A second set screw 16 which projects from a recess 15 into the elongated slot 17 is provided at the opposite end of the slot with the set screw 16 operating to counteract the effect of the set screw 16'. As a result of the arrangement depicted in FIG. 3, the space between the two draft links of the mounting system of the invention may be adjusted within a wide range without significantly limiting the freedom of maneuverability of the system during coupling.

While a specific embodiment of the invention has been shown and described in detail to illustrate the application of the inventive principles, it will be understood that the invention may be embodied otherwise without departing from such principles.

What is claimed is:

1. An adjustable device for the draft link of a three-point mounting system for supporting agricultural implements upon an agricultural tractor, said adjusting device comprising a longitudinally adjustable bipartite strut assembly having a pair of ends, with one of said ends being connected in an articulated manner to said draft link of said tractor and with the other of said ends being connected to a fixed point on said tractor, said strut assembly comprising: two partially overlapping connecting arms; means joining said two connecting arms together in frictional engagement for movement relative to each other; means defining an elongated slot having a pair of ends on one of said connecting arms along a portion thereof in overlapping relationship with the other of said connecting arms; means defining at least two screw-receiving holes in the other of said connecting arms; a pair of threaded bolts extending through said elongated slot of said first connecting arm and through said receiving holes of said first connecting arm and through said receiving holes of said other connecting arm; a pair of compression springs one each arranged respectively at one of said ends of said slot, each of said springs being compressively engaged against one of said threaded bolts; and a pair of set-screws each operatively associated with one of said compression springs for enabling adjustment of the compressive force of said springs within said elongated slot.

2. An adjusting device according to claim 1 wherein said pair of threaded bolts have ends extending outwardly from said receiving holes of said other connecting arm, said adjusting device further comprising spring means arranged on said outwardly extending ends of said bolts, and adjustment nuts threadedly engaged on the ends of said bolts, said spring means being maintained with a spring tension acting against said connecting arms at said overlapping portions thereof, said spring tension being adjustable by operation of said adjustment nut.

3. An adjusting device according to claim 2 further comprising at least one strip of friction material arranged between said two connecting arms for increasing the frictional effect between said overlapping portions thereof, an auxiliary plate having defined therein two screw receiving holes arranged in corresponding relationship with said screw receiving holes in said other connecting arm and having said threaded bolts extending therethrough, said spring means being mounted in engagement between said auxiliary plate and said adjustment nuts.

* * * * *